United States Patent
Loreto

(10) Patent No.: US 12,030,173 B2
(45) Date of Patent: Jul. 9, 2024

(54) EXTENDED REACH SHUTTER MANIPULATING DEVICE

(71) Applicant: Jim Loreto, Riverside, CA (US)

(72) Inventor: Jim Loreto, Riverside, CA (US)

( * ) Notice: Subject to any disclaimer, the term of this patent is extended or adjusted under 35 U.S.C. 154(b) by 392 days.

(21) Appl. No.: 17/552,427

(22) Filed: Dec. 16, 2021

(65) Prior Publication Data

US 2023/0191587 A1 Jun. 22, 2023

(51) Int. Cl.
*B25J 1/04* (2006.01)

(52) U.S. Cl.
CPC ........................................ *B25J 1/04* (2013.01)

(58) Field of Classification Search
CPC ................. B25J 1/04; B25J 1/02; A47F 13/06
USPC .......................................... 294/22, 209, 210
See application file for complete search history.

(56) References Cited

U.S. PATENT DOCUMENTS

| | | | | |
|---|---|---|---|---|
| 1,328,860 A | * | 1/1920 | Walsh | B25B 9/00 294/22 |
| 2,612,400 A | * | 9/1952 | Facio, Sr. | B25J 1/04 294/115 |
| 2,616,741 A | * | 11/1952 | Carl | B25J 1/04 294/111 |
| 4,615,555 A | * | 10/1986 | Bateham | B25J 1/04 294/104 |
| 4,669,769 A | * | 6/1987 | Polder, Jr. | B25B 9/00 294/111 |
| 4,711,482 A | * | 12/1987 | Brown | B25J 1/04 294/107 |
| 5,823,590 A | | 10/1998 | Forrest | |
| 6,227,584 B1 | | 5/2001 | Reuther | |
| 6,655,091 B1 | * | 12/2003 | Iwasaki | E06B 7/09 49/87.1 |
| 7,677,619 B2 | * | 3/2010 | Hutchings | B25J 1/02 56/333 |
| 7,934,756 B2 | | 5/2011 | Kroeze | |
| 9,056,393 B1 | * | 6/2015 | Gary | F21S 4/10 |
| 9,878,444 B1 | | 1/2018 | Harrington | |
| D876,191 S | | 2/2020 | Orikawa | |
| 2010/0102583 A1 | | 4/2010 | McCoy | |
| 2015/0015011 A1 | | 1/2015 | Silva | |

FOREIGN PATENT DOCUMENTS

| | | | |
|---|---|---|---|
| GB | 931441 A | * | 7/1963 |
| WO | WO2009152098 | | 12/2009 |

* cited by examiner

*Primary Examiner* — Dean J Kramer

(57) ABSTRACT

An extended reach shutter manipulating device for tilting louvers of a shutter includes a pole, a clamp, and an actuator. The clamp and the actuator are engaged to a first end and a second end of the pole, respectively. The actuator is operationally engaged to the clamp. The pole is grasped in a hand of a user proximate to the second end, positioning the user to position the clamp so that the clamp brackets a tilt rod of a shutter. The actuator can be selectively manipulated by the hand of the user so that the actuator closes the clamp on the tilt rod, positioning the user to selectively tilt louvers of the shutter.

9 Claims, 4 Drawing Sheets

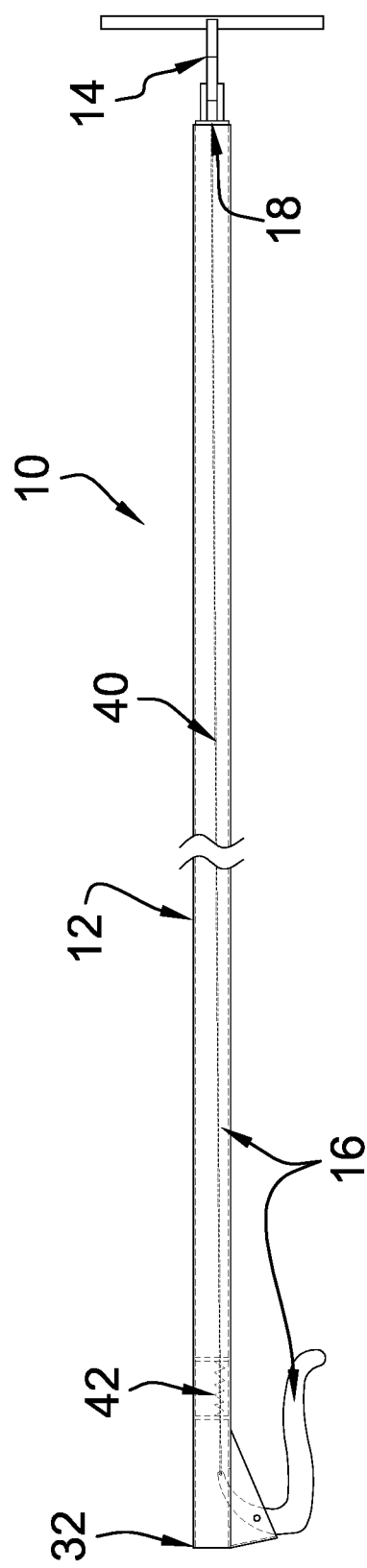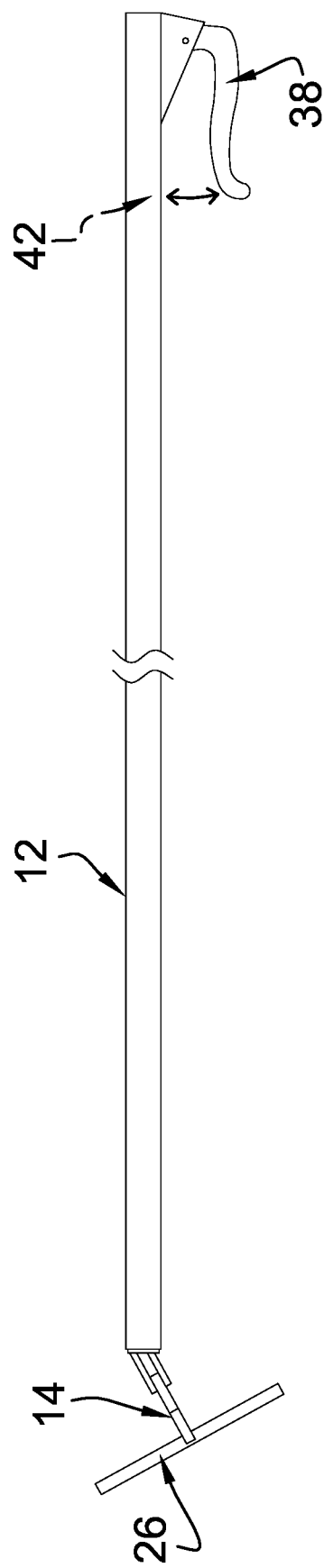
FIG. 1
FIG. 2

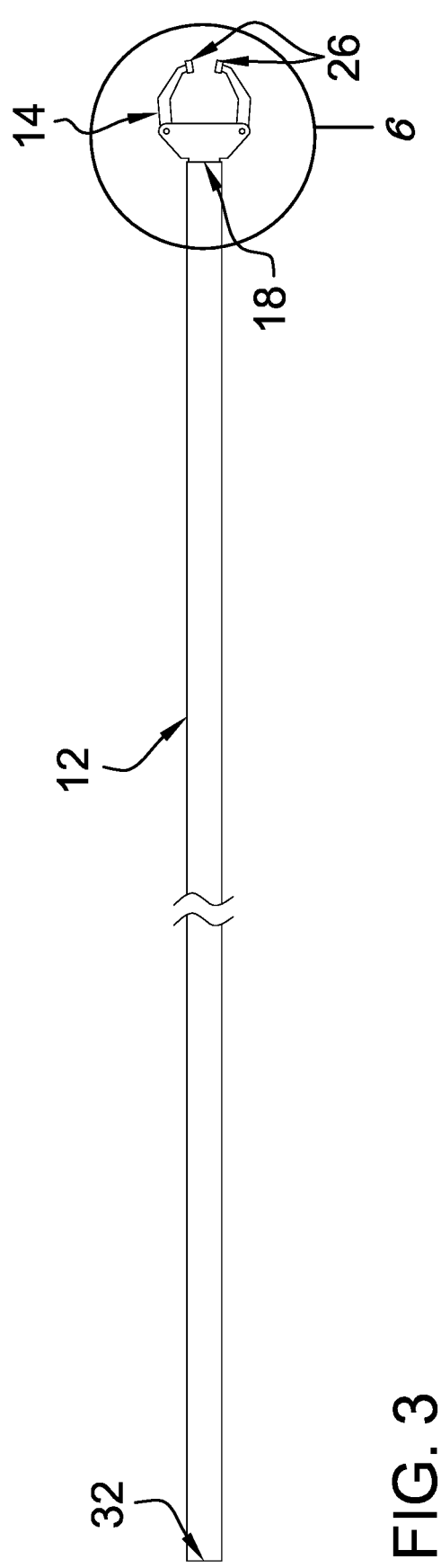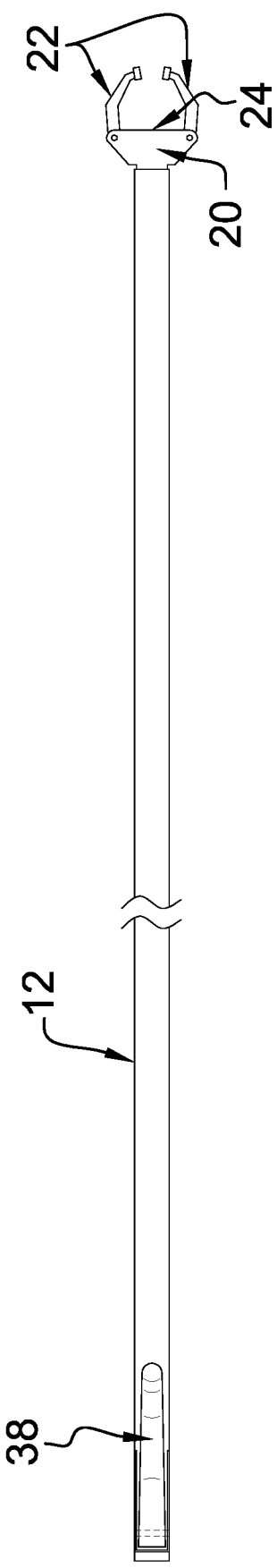
FIG. 3
FIG. 4

EXTENDED REACH SHUTTER MANIPULATING DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to extended reach devices and more particularly pertains to a new extended reach device for tilting louvers of a shutter. The present invention discloses an extended reach device comprising a poles with a clamp on one end and an actuator on the other, wherein the clamp is configured to engage a tilt arm of a shutter to selectively tilt louvers of the shutter

(2) Description of Related Art Including Information Disclosed Under 37 CFR 1.97 and 1.98

The prior art relates to extended reach devices, which generally comprising poles with grasping members on one end and a triggering device on the other, wherein the grasping member is configured for clamping to an item to pick up the item. The present invention discloses an extended reach device wherein the grasping member is configured to engage a tilt arm of a shutter to selectively tilt louvers of the shutter.

(h) BRIEF SUMMARY OF THE INVENTION

An embodiment of the disclosure meets the needs presented above by generally comprising a pole, a clamp, and an actuator. The clamp and the actuator are engaged to a first end and a second end of the pole, respectively. The actuator is operationally engaged to the clamp. The pole is configured to be grasped in a hand of a user proximate to the second end, positioning the user to position the clamp so that the clamp brackets a tilt rod of a shutter. The actuator is configured to be selectively manipulated by the hand of the user so that the actuator closes the clamp on the tilt rod, positioning the user to selectively tilt louvers of the shutter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a side view of an extended reach shutter manipulating device according to an embodiment of the disclosure.

FIG. 2 is a side view of an embodiment of the disclosure.

FIG. 3 is a top view of an embodiment of the disclosure.

FIG. 4 is a bottom view of an embodiment of the disclosure.

(j) DETAILED DESCRIPTION OF THE INVENTION

Figure 5:
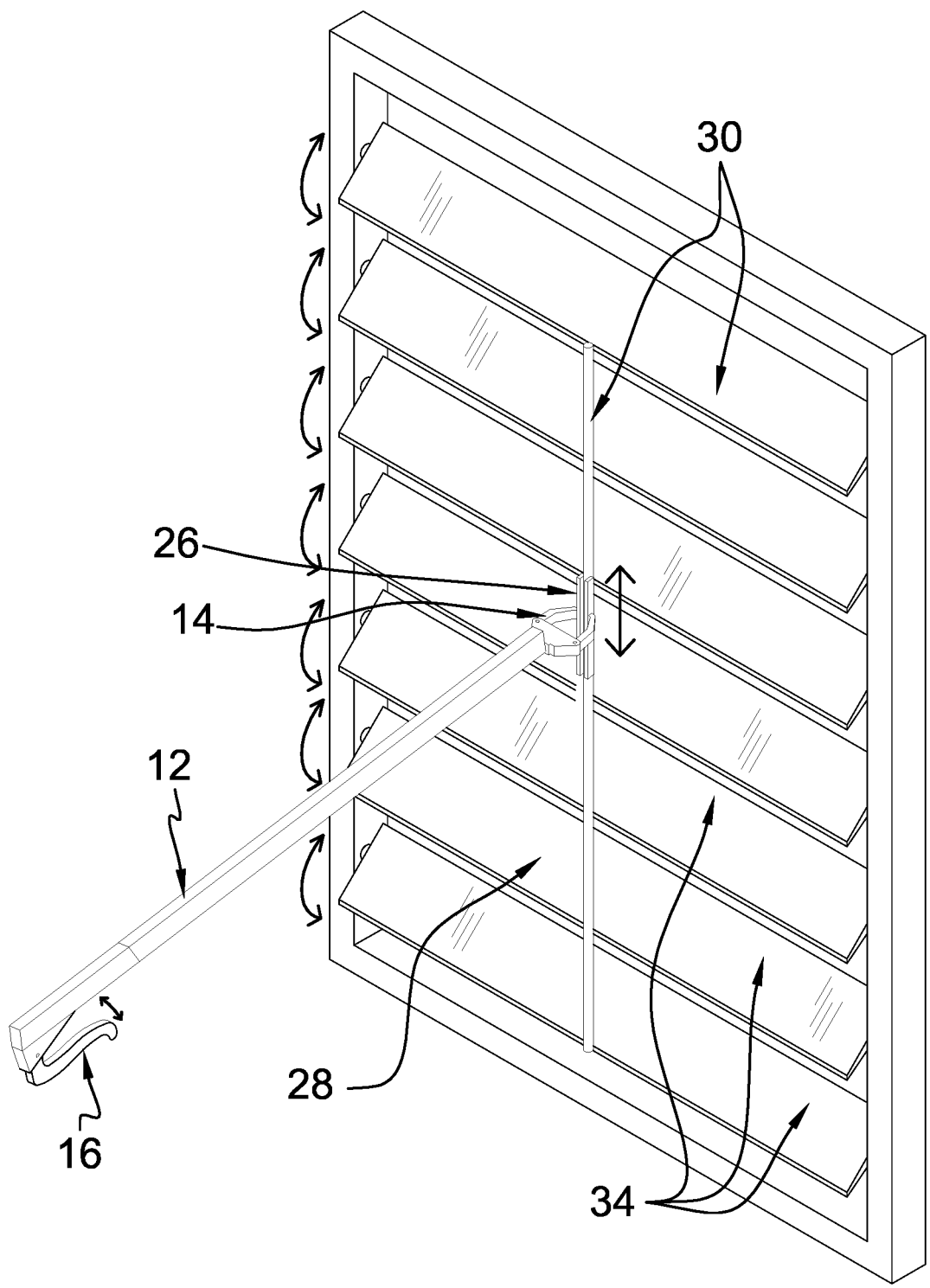
FIG. 5 is an in-use view of an embodiment of the disclosure.

With reference now to the drawings, and in particular to FIGS. 1 through 7 thereof, a new extended reach device embodying the principles and concepts of an embodiment of the disclosure and generally designated by the reference numeral 10 will be described.

As best illustrated in FIGS. 1 through 7, the extended reach shutter manipulating device 10 generally comprises a pole 12, a clamp 14, and an actuator 16. The pole 12 may be unitary, as shown in FIG. 1, although the present invention anticipates the pole 12 comprising a plurality of nested sections (not shown) so that the pole 12 is selectively extensible. The clamp 14 is engaged to a first end 18 of the pole 12.

The clamp 14 comprises a housing 20, which is hingedly engaged to the pole 12. A pair of jaws 22 is pivotally engaged to the housing 20 and extends from the housing 20 through an open face 24 of the housing 20. The jaws 22 may be arcuate, or alternatively shaped, such as, but not limited to, linear, flattened V-shaped, and the like.

Each of a pair of bars 26 is engaged to a respective jaw 22 distal from the housing 20. The bar 26 may extend bidirectionally from the respective jaw 22 so that the bar 26 is substantially perpendicular to the pair of jaws 22. The present invention also anticipates the bar 26 extending unidirectionally from the respective jaw 22, with the bars 26 extending codirectionally and substantially perpendicularly from the pair of jaws 22. The bars 26 are one or both of padded and resiliently compressible so that the pair of bars 26 is configured to be clamped to a tilt rod 28 of a shutter 30 without marring the tilt rod 28. The bars 26 may be fabric covered or may comprise rubber, silicone, or elastomer. Each bar may measure approximately 10.0 cm by 2.5 cm. The housing 20 being hingedly engaged to the pole 12 allows the pair of bars 22 to be angled relative to the pole 12 to facilitate their clamping to the tilt rod 28.

The actuator 16 is engaged to a second end 32 of the pole 12 and is operationally engaged to the clamp 14. The pole 12 is configured to be grasped in a hand of a user proximate to the second end 32, positioning the user to position the clamp 14 so that the clamp 14 brackets the tilt rod 28 of the shutter 30, as shown in FIG. 5. The actuator 16 is configured to be selectively manipulated by the hand of the user so that the actuator 16 closes the clamp 14 on the tilt rod 28, positioning the user to selectively tilt louvers 34 of the shutter 30. The present invention is anticipated to be useful in tilting the louvers 34 of shutters 30 that are not readily accessible to the user, such as, for example, shutters 30 that are elevated or positioned behind objects, such as couches, bathtubs, and the like.

Figure 6:
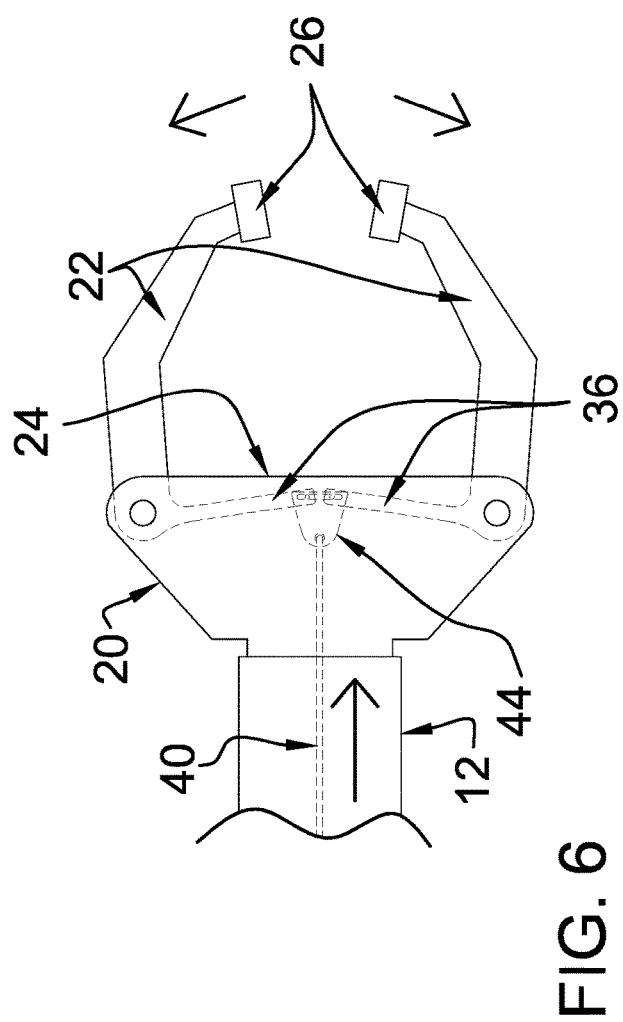
FIG. 6 is a detail view of an embodiment of the disclosure.

The actuator 16 comprises a pair of arms 36, a lever 38, and a rod 40, or other actuating means, such as, but not limited to, springs and pulleys, hydraulic cylinders, and the like. The pair of arms 36 is positioned in the housing 20 with each arm 36 being engaged to a respective jaw 22, as shown in FIG. 6. The lever 38 is pivotally engaged to the pole 12 proximate to the second end 32. The rod 40 is engaged to and extends between the lever 38 and the pair of arms 36. The rod 40 is positioned in the pole 12. The lever 38 is biased to an unlevered configuration wherein the pair of jaws 22 are open, as shown in FIG. 6, and is configured to be levered by the hand of the user to close the pair of jaws 22, as shown in FIG. 7.

The actuator 16 also may comprise a spring 42, as shown in FIG. 1, which is engaged to the pole 12 and the rod 40 so that the spring 42 is compressed as the lever 38 is levered. The spring 42 rebounds upon release of the lever 38 from the hand of the user to open the pair of jaws 22 and to return the lever 38 to the unlevered configuration. The present invention anticipates the spring 42 being engaged to the pole 12 and the rod 40 so that the spring 42 is stretched upon levering of the lever 38. The present invention also anticipates the spring 42 being engaged to and extending between the lever 38 and the pole 12, or between the pair of arms 36 and the housing 20.

Figure 7:
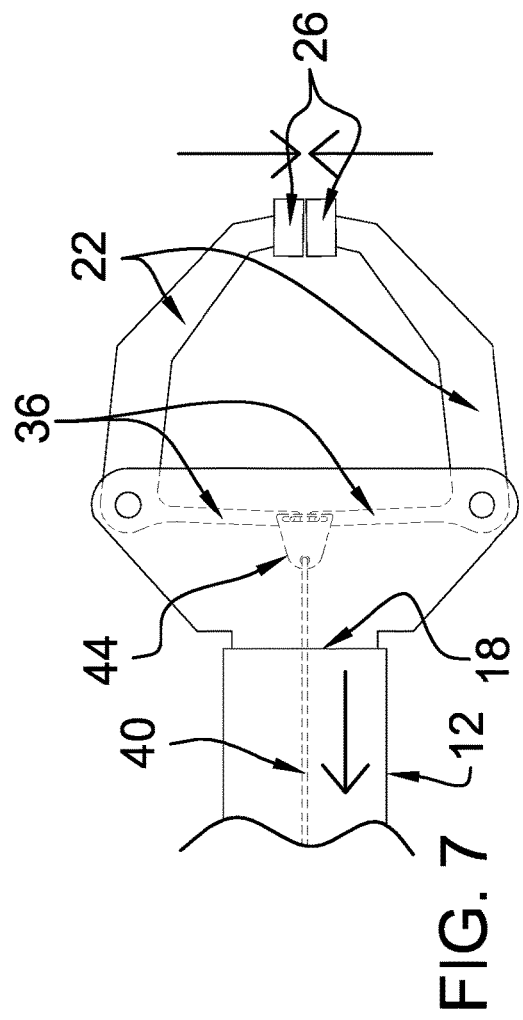
FIG. 7 is a detail view of an embodiment of the disclosure.

The actuator 16 also may comprise a bracket 44, as shown in FIG. 7, which is engaged to each arm 36 of the pair of arms 36 and to the rod 40 so that the bracket 44 is positioned to transfer movement of the rod 40 to the pair of arms 36.

In use, the pole 12 is grasped in a hand of a user proximate to the second end 32. The user then positions the clamp 14 so that the bars 26 bracket a tilt rod 28 of a shutter 30. The lever 38 is levered to clamp the bars 26 on the tilt rod 28, positioning the user to selectively tilt louvers 34 of the shutter 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An extended reach shutter manipulating device comprising:
  a pole;
  a clamp engaged to a first end of the pole;
  an actuator engaged to a second end of the pole and being operationally engaged to the clamp, wherein the pole is configured for grasping in a hand of a user proximate to the second end, positioning the user for positioning the clamp such that the clamp brackets a tilt rod of a shutter, wherein the actuator is configured for being selectively manipulated by the hand of the user, such that the actuator closes the clamp on the tilt rod, positioning the user for selectively tilting louvers of the shutter; and
  wherein the clamp comprises;
    a housing hingedly engaged to the pole;
    a pair of jaws pivotally engaged to the housing and extending from the housing through an open face of the housing;
    a pair of bars, each bar being engaged to a respective jaw distal from the housing, the bar extending bidirectionally from the respective jaw such that the bar is substantially perpendicular to the pair of jaws, each bar having a planar surface, said planar surfaces moving towards each other and being positionable to abut against each other when the clamp is closed.

2. The extended reach shutter manipulating device of claim 1, wherein the jaws are arcuate.

3. The extended reach shutter manipulating device of claim 1, wherein the bars are one or both of padded and resiliently compressible, wherein the pair of bars is configured for clamping to the tilt rod of the shutter without marring the tilt rod.

4. The extended reach shutter manipulating device of claim 3, wherein the bars are fabric covered.

5. The extended reach shutter manipulating device of claim 3, wherein the bars comprise rubber, silicone, or elastomer.

6. The extended reach shutter manipulating device of claim 1, wherein the actuator comprises:
  a pair of arms positioned in the housing, each arm being engaged to a respective jaw;
  a lever pivotally engaged to the pole proximate to the second end; and
  a rod engaged to and extending between the lever and the pair of arms, the rod being positioned in the pole, the lever being biased to an unlevered configuration wherein the pair of jaws are open, wherein the lever is configured for levering by the hand of the user for closing the pair of jaws.

7. The extended reach shutter manipulating device of claim 6, further including a spring engaged to the pole and the rod, such that the spring is compressed as the lever is levered, such that the spring rebounds upon release of the lever from the hand of the user for opening the pair of jaws and for returning the lever to the unlevered configuration.

8. The extended reach shutter manipulating device of claim 6, further including a bracket engaged to each arm of the pair of arms and to the rod, such that the bracket is positioned for transferring movement of the rod to the pair of arms.

9. An extended reach shutter manipulating device comprising:
- a pole;
- a clamp engaged to a first end of the pole, the clamp comprising:
  - a housing hingedly engaged to the pole,
  - a pair of jaws pivotally engaged to the housing and extending from the housing through an open face of the housing, the jaws being arcuate, and
  - a pair of bars, each bar being engaged to a respective jaw distal from the housing, the bar extending bidirectionally from the respective jaw such that the bar is substantially perpendicular to the pair of jaws, each bar having a planar surface, said planar surfaces moving towards each other and being positionable to abut against each other when the clamp is closed, the bars being one or both of padded and resiliently compressible, wherein the pair of bars is configured for clamping to a tilt rod of a shutter without marring the tilt rod, the bars being fabric covered, the bars comprising rubber, silicone, or elastomer;
- an actuator engaged to a second end of the pole and being operationally engaged to the clamp, wherein the pole is configured for grasping in a hand of a user proximate to the second end, positioning the user for positioning the clamp such that the clamp brackets the tilt rod of the shutter, wherein the actuator is configured for being selectively manipulated by the hand of the user, such that the actuator closes the clamp on the tilt rod, positioning the user for selectively tilting louvers of the shutter, the actuator comprising:
- a pair of arms positioned in the housing, each arm being engaged to a respective jaw,
- a lever pivotally engaged to the pole proximate to the second end,
- a rod engaged to and extending between the lever and the pair of arms, the rod being positioned in the pole, the lever being biased to an unlevered configuration wherein the pair of jaws are open, wherein the lever is configured for levering by the hand of the user for closing the pair of jaws,
- a spring engaged to the pole and the rod, such that the spring is compressed as the lever is levered, such that the spring rebounds upon release of the lever from the hand of the user for opening the pair of jaws and for returning the lever to the unlevered configuration, and
- a bracket engaged to each arm of the pair of arms and to the rod, such that the bracket is positioned for transferring movement of the rod to the pair of arms.

* * * * *